US011443272B2

(12) United States Patent
Jajula

(10) Patent No.: US 11,443,272 B2
(45) Date of Patent: Sep. 13, 2022

(54) EXPEDITED ORDER PICKUP SYSTEMS AND METHODS

(71) Applicant: Verizon Patent and Licensing Inc., Arlington, VA (US)

(72) Inventor: Venkata Ramana Jajula, Alpharetta, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 259 days.

(21) Appl. No.: 16/553,517

(22) Filed: Aug. 28, 2019

(65) Prior Publication Data

US 2021/0065107 A1 Mar. 4, 2021

(51) Int. Cl.
*G06Q 10/08* (2012.01)
*H04W 4/029* (2018.01)
*G06Q 30/06* (2012.01)

(52) U.S. Cl.
CPC ....... *G06Q 10/0836* (2013.01); *G06Q 10/087* (2013.01); *G06Q 30/0635* (2013.01); *H04W 4/029* (2018.02)

(58) Field of Classification Search
CPC ............. G06Q 10/0836; G06Q 10/087; G06Q 30/0635; H04W 4/029
See application file for complete search history.

(56) References Cited

U.S. PATENT DOCUMENTS

| 9,710,779 B1* | 7/2017 | Maloney .......... G06Q 10/08355 |
| 10,366,436 B1* | 7/2019 | Kumar ............... G06Q 30/0635 |
| 10,740,718 B2* | 8/2020 | Pylappan ............... H04W 4/025 |
| 10,769,712 B1* | 9/2020 | Edwards ........... G06Q 30/0635 |
| 11,037,097 B2* | 6/2021 | Elazary ........... G06Q 10/08355 |
| 2013/0144730 A1* | 6/2013 | Harman ............. G06Q 30/0633 705/15 |
| 2014/0279270 A1* | 9/2014 | Bertanzetti ........ G06Q 30/0635 705/26.81 |
| 2014/0344097 A1* | 11/2014 | Horowitz ......... G06Q 10/08345 705/26.4 |
| 2015/0186803 A1* | 7/2015 | Stong ..................... G06Q 10/02 705/5 |
| 2015/0362328 A1* | 12/2015 | Li .......................... G01C 21/34 701/411 |
| 2016/0086128 A1* | 3/2016 | Geiger ........... G06Q 10/063118 705/7.17 |

(Continued)

OTHER PUBLICATIONS

"Warehouse space capacity and delivery time window considerations in dynamic lot-sizing for a simple supply chain" by Jaruphongsa et al., (Year: 2004).*

*Primary Examiner* — Zeina Elchanti

(57) ABSTRACT

Expedited order pickup systems and methods are provided. An exemplary system is configured to receive order information including an order identifier identifying an order and a user identifier identifying a user associated with the order, determine that the user is commencing travel to a fulfillment location to pick up an item associated with the order, track, in response to the determination, a geographic location of the user, determine, based on the geographic location, an estimated time of arrival of the user at the fulfillment location, and signal the estimated time of arrival of the user at the fulfillment location to facilitate timely preparation of the item for pickup by the user at the fulfillment location.

18 Claims, 11 Drawing Sheets

(56) References Cited

U.S. PATENT DOCUMENTS

| | | | | |
|---|---|---|---|---|
| 2017/0127215 A1* | 5/2017 | Khan | ................ | H04W 4/021 |
| 2018/0349849 A1* | 12/2018 | Jones | ............ | G06Q 10/08345 |
| 2019/0333130 A1* | 10/2019 | Jha | ................ | G06F 16/9024 |
| 2019/0385121 A1* | 12/2019 | Waliany | ............ | G06Q 10/0838 |
| 2020/0160264 A1* | 5/2020 | Silverman | .......... | G06Q 10/0834 |
| 2020/0175767 A1* | 6/2020 | Stivi | ................ | G08B 25/10 |
| 2020/0293944 A1* | 9/2020 | Furukawa | ............ | G06N 20/00 |
| 2020/0333789 A1* | 10/2020 | Suzuki | ................ | G01S 17/89 |
| 2020/0380442 A1* | 12/2020 | Kuwahara | ........ | G06Q 10/06315 |
| 2021/0042701 A1* | 2/2021 | Ovadia | ................ | G06Q 50/28 |
| 2021/0155221 A1* | 5/2021 | Gottehrer | ........... | G01C 21/3438 |
| 2021/0294287 A1* | 9/2021 | Valin | ................ | H02S 20/32 |

* cited by examiner

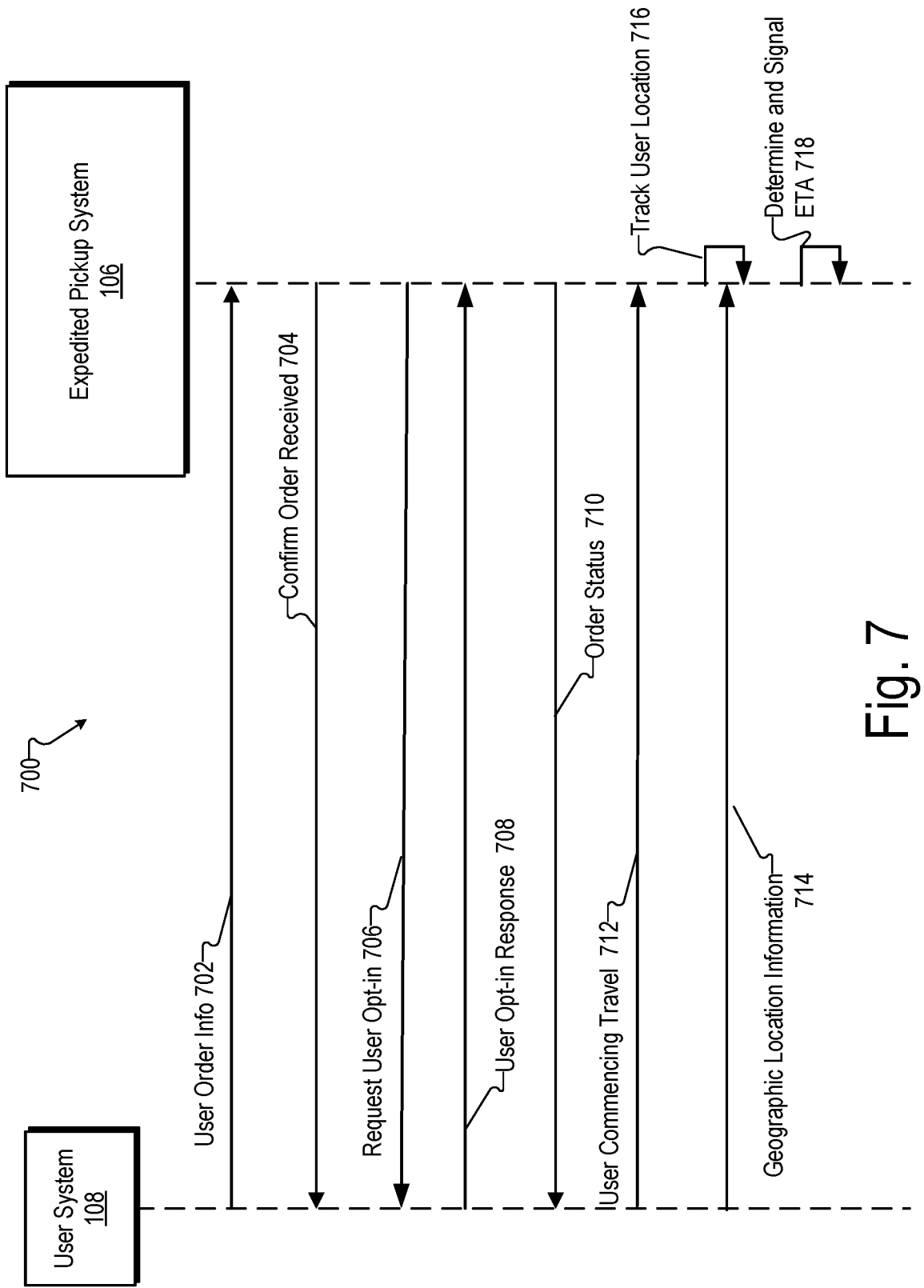

EXPEDITED ORDER PICKUP SYSTEMS AND METHODS

BACKGROUND INFORMATION

As online e-commerce has progressed, typical brick-and-mortar merchants have lost market share to online retailers. While some of the lost market share may be attributed to lower pricing at the online retailers, other factors such as ease of product selection and convenience of home delivery, among others, have also played a role in consumers shifting to online shopping.

Many brick-and-mortar merchants have established an online presence enabling consumers to select items online and either have such items delivered to their home or made available for pickup at a store location. Home delivery, while typically convenient, may present a number of undesirable differences from a typical shopping experience, such as shipping cost, time to delivery, and risk of theft upon delivery of items to an unoccupied location, for example. Store pickup may also present undesirable aspects, such as a consumer having to wait in a queue and/or while items are collected before being provided the ordered items. Moreover, the merchant may have to maintain the items in a "ready" state at the pickup location until the consumer visits the location to collect the items at some unknown time in the future. These aspects of traditional in-store pickup of items ordered online may lead to inconvenience for the consumer and/or inefficiency for the merchant.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 7 illustrates another exemplary operation flow diagram according to embodiments of the present disclosure.

DETAILED DESCRIPTION OF PREFERRED EMBODIMENTS

Exemplary expedited order pickup systems and methods are described herein. The systems and methods described herein may enable a user to place an order via an electronic portal (e.g., a web site, a mobile application, etc.) and to receive expedited service when picking up an item from the order at a fulfillment location (e.g., without entering a building associated with the fulfillment location, with minimal or no wait time at the fulfillment location, etc.). For example, a user may access a merchant's web site from a user system (e.g., a personal computer, a mobile phone, a tablet, etc.), identify an item for purchase, purchase the item, and indicate the desire for pickup (e.g., "curb-side" pickup) at a fulfillment location where the order can be filled and/or that is convenient to the user. When the user commences travel to the fulfillment location, the user's geographic location may be tracked and used to determine an estimated time of arrival at the fulfillment location. The determined estimated time of arrival may be signaled to facilitate timely preparation of the item for pickup and, in turn, convenient and efficient pickup of the purchased item at the fulfillment location.

To illustrate one example, an exemplary system includes a processor and a non-transitory computer-readable medium communicatively coupled to the processor and storing instructions executable by the processor to receive order information including an order identifier identifying an order and a user identifier identifying a user associated with the order, determine that the user is commencing travel (e.g., by receiving a message indicating that the user is commencing travel) to a fulfillment location to pick up an item associated with the order, track, in response to the message, a geographic location of the user, determine, based on the geographic location, an estimated time of arrival of the user at the fulfillment location, and signal the estimated time of arrival of the user at the fulfillment location to facilitate timely preparation of the item for pickup by the user at the fulfillment location.

Various exemplary embodiments will now be described with reference to the figures. The disclosed embodiments may provide one or more of the features and benefits mentioned above and/or various additional and/or alternative features and benefits that will be made apparent herein.

Figure 1:
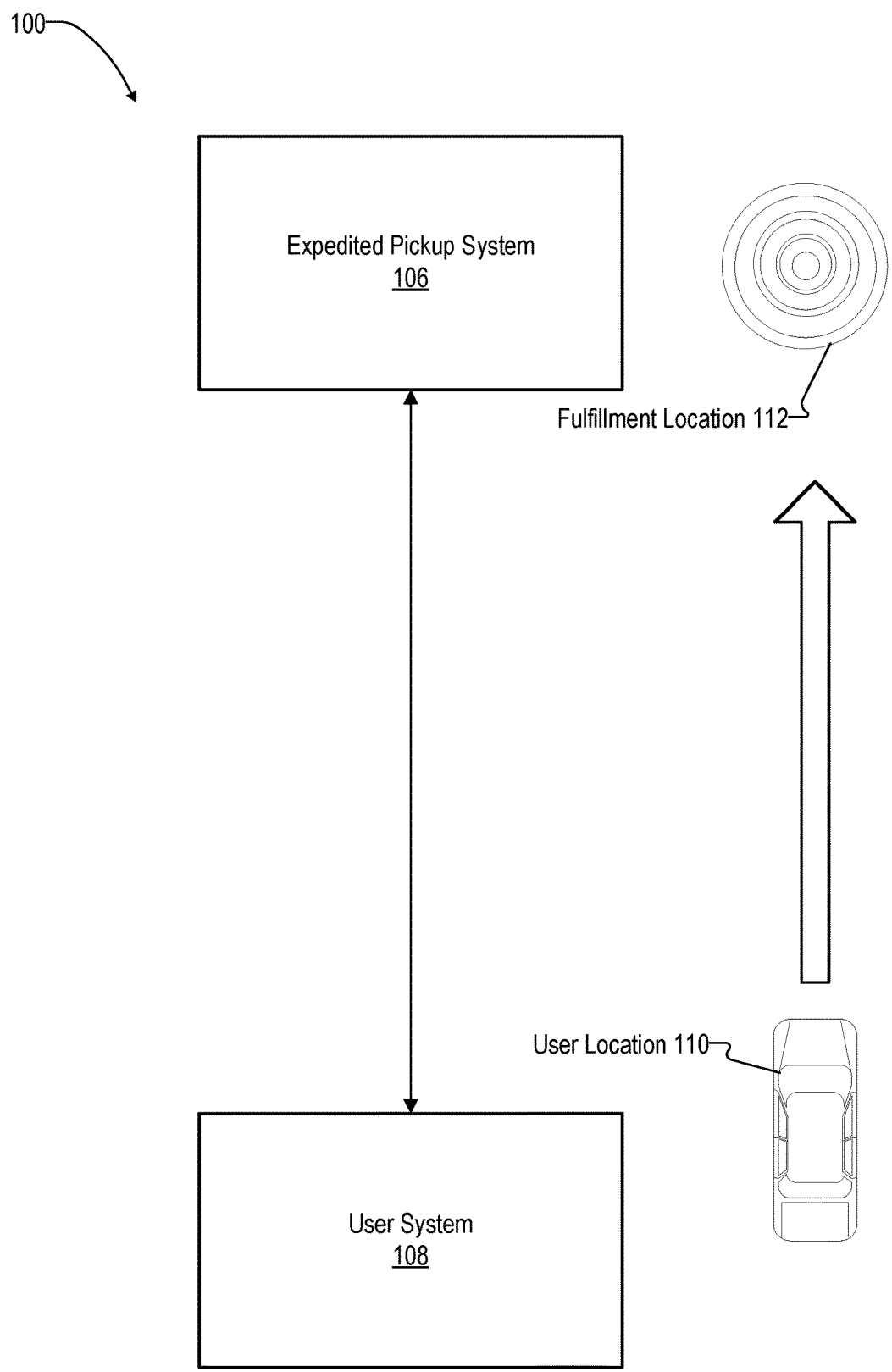
FIG. 1 illustrates an exemplary configuration in which an expedited order pickup system is employed, according to principles described herein.

FIG. 1 illustrates an exemplary configuration 100 in which an expedited order pickup system is employed according to principles described herein. As shown, configuration 100 may include an expedited pickup system 106 communicatively coupled to a user system 108. User system 108 may be associated with a user location 110, which may be a geographic location at which user system 108 and/or a user of user system 108 is located. Expedited pickup system 106 and user system 108 may be configured to perform one or more of the operations described herein to facilitate expedited user pickup of ordered items at a fulfillment location 112.

Fulfillment location 112 may include any suitable location at which a user may pick up one or more items of an order placed by the user, such as a geographic location at which a user may pick up one or more order items. According to some embodiments, a fulfillment location 112 may include a structure configured to facilitate on-site pickup of order items. For example, a fulfillment location 112 may form part of a warehouse associated with a merchant, a drive-thru style pickup window, a curbside kiosk, and/or a series of access-controlled storage boxes positioned within reach of a user on foot or in a vehicle, for example. For instance, a fulfillment location 112 may include one or more kiosks that are installed in a parking lot of a merchant's brick-and-mortar facility and that may include one or more drive-thru style windows with desired indications as to where a particular user might approach to retrieve an item from an order. Such configurations are exemplary only, and fulfillment location 112 may be configured in any suitable manner to facilitate pickup of order items.

User system 108 may include one or more devices configured to be operated by a user and/or to perform the user system operations described herein. For example, user system 108 may include any suitable device configured to enable a user to send and receive information between the user system 108 and a separate device, via a network (e.g., the Internet). In certain embodiments, user system 108 may include a handheld terminal (e.g., a mobile phone, a digital tablet device, a personal digital assistant, etc.), a personal computing device (e.g., a laptop computer, a desktop computer, etc.), a navigation system (e.g., a portable satellite navigation system, a vehicle installed navigation system, etc.), and an in-vehicle entertainment/information system, among others.

User system 108 may be communicatively connected to one or more networks to facilitate the sending and receiving of messages and may communicate via any suitable communication device and protocol. For example, user system 108 may include an ethernet interface, a Wi-Fi interface, a mobile data interface (e.g., 4G, LTE, etc.), among others, and software configured to enable communication over the provided interfaces.

User system 108 may be configured to communicate using any suitable message format. For example, user system 108 may be configured to transmit and receive API calls (e.g., RESTful, SOAP, etc.) via, for example, a microservice (e.g., a microservice implemented on one or more web service providers servers) using any suitable architecture, protocol, or communications technology for interfacing between remote computing devices (e.g., JSON, XML, etc.)

User system 108 may include one or more devices configured to obtain and transmit information related to a geographic location of user system 108 and thereby, user location 110 corresponding to the location of a user operating user system 108. For example, user system 108 may include a mobile device (e.g., a smart phone) configured to obtain information related to the geographic location of the mobile device based on Global Positioning System (GPS) and/or cellular triangulation, for example.

According to another example, user system 108 may include one or more devices installed in a vehicle configured with "connected car technology," i.e., an installed device with tracking and communication services dedicated to the vehicle in which it is installed. Such a device may connect, for example, to a diagnostic port of the vehicle, to a mobile user system (e.g., via an "app"), and/or via one or more mobile networks, for example, to enable communications directly from the vehicle to a remotely located server and/or service. For example, the vehicle may include a dedicated, subscription-service based device connected directly to the vehicle's diagnostic or service port (e.g., OBD-II) enabling diagnostics, speed monitoring, geographic location tracking, emergency services, etc. of the vehicle.

User system 108 may further include one or more user interfaces configured to enable a user to interact with functionality of the user system 108 and to allow the user to send and receive messages. According to embodiments disclosed herein, user system 108 may include a display (e.g., a touch screen) enabling a user to view and compose messages, an audio speaker enabling the user to hear messages, and one or more input devices (e.g., keyboard, mouse, microphone, etc.) enabling user input.

In certain embodiments, user system 108 may be configured to enable ecommerce shopping functionality, e.g., browsing and purchasing of items available from one or more online merchants, and selection of pickup options associated therewith. For example, a user may use user system 108 to browse a merchant website to identify one or more items the user may wish to purchase, select such items, purchase the selected items, and select a pickup option (e.g., expedited pickup). The browsing and purchase of items may take place from any suitable application operating on user system 108, e.g., a web browser, an app, etc., enabling interaction and information exchange with a web server of a merchant, e.g., via an user interface on user system 108 and one or more APIs available on the server, among others.

User system 108 may store a user identifier including any suitable combination of data configured to allow identification of a user of user system 108 by a computing device and/or a user and that may be transmitted and received via electronic means (e.g., a network). For example, a user identifier may include a numeric string (e.g., a telephone number), an alphanumeric string (e.g., an e-mail address), a barcode, a QR code, a sound combination, or any other suitable identifying data that can be transmitted and received and used to identify a user. According to some embodiments, a user may be assigned a unique user identifier, and such user identifier may be stored in data storage present on user system 108.

User system 108 may be configured to communicate with expedited pickup system 106, including providing information to and receiving information from expedited pickup system 106. For example, user system 108 may provide, to expedited pickup system 106, information related to the user of user system 108 (e.g., a user identifier), user location 110 associated with user system 108 (e.g., a geographic location of user system 108 and/or the user of user system 108), and an online order placed by the user (e.g., an order identifier). User system 108 may provide such information to expedited pickup system 106 to facilitate expedited user pickup of ordered items at fulfillment location 112.

Expedited pickup system 106 may be configured to perform one or more operations described herein to facilitate and expedite user pickup of ordered items. To that end, expedited pickup system 106 may include any suitable computing devices, such as hardware and software configured to perform operations of expedited pickup system 106 described herein. For example, expedited pickup system 106 may include one or more computing devices (e.g., servers, personal computers, etc.) configured to execute one or more software applications to provide functionality described herein.

Expedited pickup system 106 may be communicatively connected to one or more networks to facilitate the sending and receiving of data (e.g., messages, information, etc.) and may communicate via any suitable communication device and protocol. For example, expedited pickup system 106 may include an ethernet interface, a Wi-Fi interface, a mobile data interface (e.g., 4G, LTE, etc.), among others, and software configured to enable communication over the provided interfaces.

Expedited pickup system 106 may include one or more applications configured to enable communication (e.g., sending and transmitting of data) using any suitable protocol and message format. For example, expedited pickup system 106 may include applications configured to transmit and receive API calls (e.g., RESTful, SOAP, etc.) via, for example, a microservice (e.g., a microservice implemented on one or more web service servers) using any suitable architecture, protocol, or communications technology for interfacing between remote computing devices (e.g., JSON, XML, etc.)

Expedited pickup system 106 may be configured to store information corresponding to user system 108 (e.g., mobile devices, personal computers, etc. included in user system 108). Additionally, information related to each of the messaging services present on user system 108 may be stored by expedited pickup system 106, to enable direct communication between expedited pickup system 106 and user system 108 (e.g., to facilitate tracking of geographic location information). To this end, an identifier associated with user system 108 may be registered with expedited pickup system 106, e.g., as part of subscription service information associated with a user based on subscription services offered by an operator of expedited pickup system 106, thus enabling direct communication with user system 108 by expedited pickup system 106.

In certain examples, expedited pickup system 106 may include one or more navigation and/or mapping applications configured to plan travel routes, modify travel routes, determine various aspects of travel, etc. For example, expedited pickup system 106 may include a stand-alone navigation application configured to plan a proposed route from user location 110 to fulfillment location 112, and provide the proposed route to user system 108 to enable the user of user system 108 to follow the proposed route to travel to fulfillment location 112.

In other examples, expedited pickup system 106 may be configured to interface with one or more navigation systems such as one or more webservices (e.g., via API calls) associated with a navigation provider (e.g., MAPQUEST, GOOGLE MAPS, WAZE, BING MAPS, etc.). For example, geographic location information received from user system 108 may be provided by expedited pickup system 106 to a navigation provider in an API request. In response to such a request, a webservice of the navigation provider may return (e.g., via a response) navigation information including a proposed route from user location 110 to fulfillment location 112. The proposed route may be provided, e.g., by expedited pickup system 106 or by the webservice, to user system 108 to enable the user to follow the proposed route to travel to fulfillment location 112.

Expedited pickup system 106 may be configured to process any desired data, in a live, transactional, and/or streamed environment, and may be scalable to allow for reception and processing of a desired number of transactions per unit time. To this end, expedited pickup system 106 may implement one or more stream processing applications/interfaces (e.g., Kafka, Spark, etc.), to enable real-time processing of, for example, order information and user geographic location information including, e.g., latitude/longitude coordinates obtained from the geographic location information sent by user system 108 and received by expedited pickup system 106.

Expedited pickup system 106 may include one or more user interfaces configured to provide information to an operator of expedited pickup system 106, which may include an operator located at fulfillment location 112. For example, expedited pickup system 106 may include one or more display devices configured to provide text and/or image data to an operator, the data being related to one or more of an order, a user, a user location 110, etc. Such interfaces may provide information related to expedited pickup of items of an order to the operator in any suitable manner (e.g., a map display, a time display, etc.).

According to some embodiments, expedited pickup system 106 may offer functionality allowing an operator of the system (e.g., a merchant) to customize and configure functionality of expedited pickup system 106. To this end, expedited pickup system 106 may include one or more customization interfaces for allowing customization of functionality disclosed herein by an operator of expedited pickup system 106. For example, expedited pickup system 106 may enable remote connection and configuration via, for example, a remote administration tool (e.g., puTTy) over SSH. Alternatively, or in addition, expedited pickup system 106 may enable remote configuration via, for example, a web interface, whereby an operator may customize functionality provided by expedited pickup system 106.

Expedited pickup system 106 may be configured to receive order information (e.g., an order identifier) for an order, determine that a user associated with the order is commencing travel to fulfillment location 112 to pick up an item associated with the order, track a geographic location of the user, and determine and provide an estimated time of arrival of the user at fulfillment location 112.

Taking an exemplary order process for purposes of explanation, a user may utilize user system 108 to browse, select, and purchase an item, as desired, from a merchant. During the order process, the user may indicate the desire for expedited pickup of the item. The associated order information for the order may be transmitted from user system 108 and/or from the merchant to expedited pickup system 106.

Order information may include any suitable information for correlating items of an order with a user desiring to pick up those items. For example, order information may include a user identifier and an order identifier, among other information. The order identifier may include any suitable combination of data configured to allow identification of an order by a computing device and/or a user and that may be transmitted and received via electronic means (e.g., a network), and stored in a database. For example, an order identifier may include a numeric string, an alphanumeric string, a barcode, a QR code, a sound combination, or any other suitable identifying data that can be transmitted, received, and used to identify an order. An order identifier may be a unique identifier relative to a particular merchant, or at least pseudo-unique such that one order can be distinguished from another order by way of the order identifier.

Expedited pickup system 106 may receive and process the order information for an order in any way suitable to support further operations of expedited pickup system 106 to expedite pickup of an item of the order. For example, expedited pickup system 106 may store data representative of the order information, identify a user associated with the order, identify one or more devices of user system 108 as being associated with the user and/or the order, generate and send one or more messages to user system 108 based on the order information (e.g., an order confirmation messaging confirming receipt of the order, an order ready message indicating that an order item is available for pickup at fulfillment location 112, etc.).

Expedited pickup system 106 may be configured to determine that a user associated with an order has commenced travel to fulfillment location 112 in any suitable manner. The term "commencing travel" and determination or confirmation thereof, shall be understood to include any situation related to a user's beginning to move toward fulfillment location 112 with the intention of arrival thereat to pick up items of the order. Exemplary ways that expedited pickup system 106 may determine that a user has commenced travel to fulfillment location 112 will now be described. The examples are illustrative and not limiting. Additional or alternative ways of determining that a user has commenced travel to fulfillment location 112 may be implemented in other examples.

In certain examples, expedited pickup system 106 may determine that a user has commenced travel to fulfillment location by receiving a message from user system 108 that expressly indicates that the user is beginning to move (i.e., travel) to fulfillment location 112. User system 108 may send such a message in response to receiving user input indicating an intent of the user to begin traveling to fulfillment location 112. For example, user system 108 may display a user interface that includes an option that may be selected by the user to indicate the user's intent to begin traveling to fulfillment location 112. In certain examples, the option may be included in a confirmation message sent by expedited pickup system 106 to user system 108 indicating that the order has been received or that the order is available for pickup at fulfillment location 112. In response to user selection of the option, user system 108 may send a message descriptive of the user selection of the option to expedited pickup system 106, which may receive and interpret the message to indicate that the user is commencing travel to fulfillment location 112.

In certain examples, a user may input a day/time or other window of time in which the user intends to pick up the item. User system 108 may send a message, at any suitable time, to expedited pickup system 106 to indicate the user-selected window of time in which the user intends to pick up the item. Expedited pickup system 106 may be configured to determine that the user commences travel to the fulfillment location 112 at the start of the selected window of time. For example, a user may receive a message indicating that the item is available for pick up, and in response the user may indicate a time window when the user will pick up the item (e.g., 5-8 pm today).

In certain examples, expedited pickup system 106 may be configured to determine that a user commences travel to fulfillment location 112 in one or more other ways, such as by making the determination without receiving from the user an express indication that the user is commencing travel to fulfillment location 112. For example, expedited pickup system 106 may be configured to monitor for cues in location data of user system 108 that indicate that the user appears to be traveling to the fulfillment location 112 with a potential intent to pick up an order item (e.g., the user is headed in that direction and/or within a threshold distance in a way that differs or aligns with historical travel patterns of the user). In certain implementations, expedited pickup system 106 may be configured to employ artificial intelligence analysis of previous user travel patterns to identify and use probabilities that the user is traveling to fulfillment location 112 as a basis for determining that the user commences travel to fulfillment location 112.

In certain examples, expedited pickup system 106 may be configured to send a confirmation message to user system 108 in response to determining that a user of user system 108 commences travel to fulfillment location 112. For example, expedited pickup system 106 may detect that a user is traveling along an expected path toward fulfillment location 112 and, in response, may send a confirmation message to user system 108. The confirmation message may request that the user provide input to indicate whether the user is traveling to pick up an order item at fulfillment location 112 (e.g., "Are you heading to pick up your order?"). Expedited pickup system 106 may be configured to send additional or alternative confirmation messages to user system 108 to facilitate user confirmation of travel to pick up an order item. Expedited pickup system 106 may, in certain examples, determine that a user has commenced travel to fulfillment location 112 to pick up an order item based on receiving an affirmative reply to such a confirmation message.

Following a determination that the user is commencing travel to fulfillment location 112, expedited pickup system 106 may track a geographic location 110 of the user. For example, expedited pickup system 106 may receive, from a user's mobile phone or other device of user system 108, information (e.g., latitude/longitude coordinates) related to a user's geographic location 110 based on GPS and/or cellular triangulation data, among others. Expedited pickup system 106 may receive the geographic location information in any suitable way, such as via a stream processing application (e.g., Kafka) at a predetermined frequency (e.g., continuously, every 10 seconds, every minute, etc.), by listening for and receiving the geographic information sent from a user system 108 (i.e., push), or by actively requesting such data (i.e., pull) from user device 108.

According to some embodiments, prior to tracking user location 110, expedited pickup system 106 may request confirmation that the user agrees to opt-in to location tracking. For example, an SMS message may be sent to one or more user devices registered with expedited pickup system 106 requesting such confirmation by return response. In certain examples, a message sent by expedited pickup system 106 to user system 108 may include a link (e.g., a hyperlink) that may be selected by a user to enable tracking of the location of the user. Such a link may be useful when an order is made from a different device than a device that is tracked as the user travels to pick up an order item (e.g., when a personal computer is used to place an order and a mobile device is carried by a pickup person, when a mobile device is used to place an order and a trackable vehicle is used for pickup, etc.) Alternatively, a user may save a "general opt-in confirmation" indicating express consent to be tracked for all orders placed for expedited pickup.

Based on the geographic location information received, expedited pickup system 106 may determine and signal information related to an estimated time of arrival of a user at fulfillment location 112. The term "estimated time of arrival," or "ETA," as used herein, may refer to any information that when implemented may allow for preparation of an order for pickup by a user at a time corresponding to an approximate arrival time of a user at fulfillment location 112. While the examples presented herein use the term "estimated time of arrival" to refer to a clock time or time count, the term is not intended to be so limited in all examples. For example, an "estimated time of arrival" may include geographic location information of the user that indicates when the user's geographic location is at a predetermined distance from fulfillment center 112. According to another example, "estimated time of arrival" may include correlating an arrival time of a user at fulfillment location 112 with an average order preparation time (e.g., 10 minutes) at fulfillment center 112. Other examples of estimated time of arrival are also considered by the inventors of the present disclosure.

Determination of an ETA may be performed by expedited pickup system 106 in any suitable manner. For example, expedited pickup system 106 may be configured to submit latitude/longitude coordinates received from user system 108 to a navigation application running on expedited pickup system 106 and/or to a webservice navigation provider, determine a suitable path from user location 110 to fulfillment location 112 based on the navigation application, and determine an estimated time of arrival of the user at fulfillment location 112. Expedited pickup system 106 may calculate an ETA based on distance from user location 110 to fulfillment location 112 according to the proposed route and a measured or predicted rate of travel of the user (e.g., an average speed of the user such as vehicle speed in certain examples).

According to another example, expedited pickup system 106 may determine an ETA by sending geographic location information of the user to a webservice navigation provider, and receiving from the webservice navigation provider an ETA estimated by the navigation provider. In such an example, the webservice navigation provider may perform the desired determination regarding travel time based on the proposed route from user location 110 to fulfillment location 112.

Expedited pickup system 106 may be further configured to adapt an ETA of a user at fulfillment location 112 based on various circumstances associated with travel to fulfillment location 112. For example, based on a planned route from user location 110 to fulfillment location 112 (e.g., prepared by a navigation service provider accessing crowd-sourced traffic information), it may be possible for expedited pickup system 106 to adapt an estimated time of arrival based on an actual, real-time velocity of moving traffic, traffic problems (e.g., congestion, accident, etc.), distance, etc. This estimated time of arrival may then be adapted as desired during progress of the user from user location 110 to fulfillment location 112 based on real-time geographical location data provided by user system 108 to expedited pickup system 106.

To this end, expedited pickup system 106 may be configured to receive (e.g., in response to a call to an web service/API) traffic information from a traffic service provider (e.g., MAPQUEST, GOOGLE MAPS, WAZE, etc.) providing information related to traffic flow along a planned route to fulfillment location 112. For example, on a path between user location 110 and fulfillment location 112, congestion may cause a slowdown that may impact a time of arrival of the user at fulfillment location 112. Therefore, upon receipt of information indicating the slowdown, expedited pickup system 106 may adjust the estimated time of arrival of the user at the order fulfillment location 112 based on the slowdown.

Alternatively, or in addition, expedited pickup system 106 may be configured to access historical traffic data for estimating a flow of traffic at a time when it has been determined that the user is commencing travel to fulfillment location 112. Expedited pickup system 106 may access such historical traffic information in any suitable manner. For example, expedited pickup system 106 may track and store travel times for one or more users over time via various routes from various geographic locations to fulfillment location 112. This information may then form a basis for estimations made by expedited pickup system 106.

Expedited pickup system 106 may be configured to detect user deviations from a proposed route between user location 110 and fulfillment location 112, and to update an estimated time of arrival based on such deviations. For example, a user deviation may be considered to occur when geographic location information indicates that a user is no longer making progress from user location 110 toward fulfillment location 112.

Expedited pickup system 106 may detect user deviations in any suitable manner. As an example, expedited pickup system 106 may detect, based on real-time geographic information from user system 108, that the user has left the planned route (e.g., traveled in a direction inconsistent with the planned route to fulfillment location 112). If the user does not rejoin the planned route or begin progressing toward fulfillment location 112 within a predetermined threshold amount of time (e.g., 2 minutes), expedited pickup system 106 may determine that the user has deviated.

As another example, a user may stop along the planned route, and may fail to advance for a predetermined threshold amount of time (e.g., a stop at a restaurant for a meal). Under such circumstances expedited pickup system 106 may determine that a deviation has occurred and may request a user to provide a new estimated time of departure and/or automatically monitor the user and determine when travel to fulfillment location 112 has recommenced.

According to some embodiments, when a certain number of detected deviations of the user from a determined path between user location 110 and fulfillment location 112 exceeds a predetermined threshold (e.g., 3 deviations), expedited pickup system 106 may send a message to the user requesting confirmation that the user is still intending to travel to fulfillment location 112 during the present journey. Such a message may be sent by SMS, email, etc., and may request a response indicating confirmation that the user intends to travel to fulfillment location 112. In the event the user indicates that travel to the fulfillment location 112 has been canceled, expedited pickup system 106 may signal this information to an operator of expedited pickup system 106 such as an operator located at fulfillment location 112 such that the operator may take appropriate action (e.g., return items to the warehouse, store items for later pickup, etc.)

Expedited pickup system 106 may be configured to signal the determined ETA of the user at the order fulfillment location 112. The signaling may be performed in any suitable way. For example, expedited pickup system 106 may provide data representative of the ETA to an operator of fulfillment location 112, such as by transmitting a message representing the ETA to a device at fulfillment location 112 and/or displaying the ETA at fulfillment location 112. As a user progresses in traveling from user location 110 toward fulfillment location 112, expedited pickup system 106 may determine and signal an updated ETA.

Alternatively, or in addition, expedited pickup system 106 may be configured to signal, via one or interfaces and/or webservices, geographic location information of the user during the travel to fulfillment location 112. For example, as the user progresses in traveling from user location 110 toward fulfillment location 112, a map display may be updated to reflect a geographic location 110 of the user such that an operator monitoring the one or more interfaces of expedited pickup system 106 can determine proximity of the user to fulfillment location 112.

Depending on desired functionality, customization of ETA and other functionality of expedited pickup system 106 may be performed via a customization interface of expedited pickup system 106. For example, a merchant may wish to alert an operator at fulfillment location 112 of the approach of a user to fulfillment location 112 based on an average time for order preparation. According to such an example, the operator may determine that average order preparation is 10 minutes at a particular fulfillment location 112, and may therefore configure expedited pickup system 106 to signal imminent arrival of the user at fulfillment location 112 when it is determined that an ETA of user is 10 minutes. This may then allow for the operator to prepare and position items for pickup at fulfillment location 112 accordingly.

According to another example, a merchant may desire to display only user location on a map display at fulfillment location 112. The merchant may customize a display interface at fulfillment location accordingly via the customization interface of expedited pickup system 106.

Figure 2:
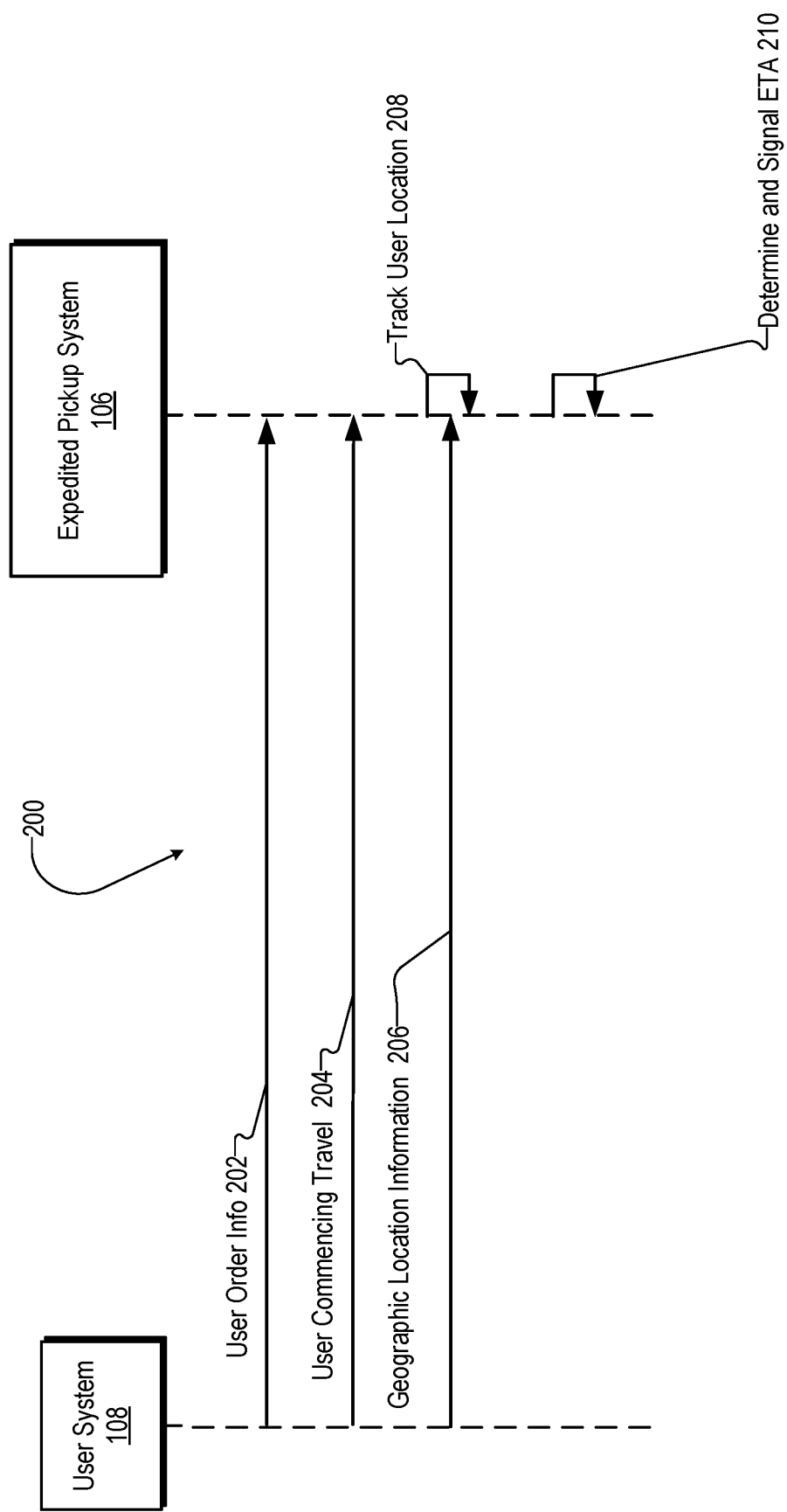
FIG. 2 illustrates an exemplary operation flow diagram according to embodiments of the present disclosure.

FIG. 2 illustrates an exemplary operation flow diagram 200. Operations depicted in FIG. 2 are exemplary, and more or fewer operations may be performed by user system 108 and expedited pickup system 106, as desired and in any suitable way for implementing principles of the present disclosure.

User system 108 (e.g., a tablet) may send order information to expedited pickup system 106 (operation 202). For example, a user may search a merchant's website and select one or more desired items for pickup and during placement of the order, select an "expedited pick up" option for the items. Order information descriptive of the user's order, including the selection for expedited pickup may then be sent to expedited pickup system 106, via, for example, an API call to a webservice associated with expedited pickup system 106. In other words, web site functionality running on user system 108 may call functions of an API running in a web service on expedited pickup system 106 to send the order information. Operation 202 may be performed in any suitable manner according to principles described herein.

According to some embodiments, expedited pickup system 106 may be configured to determine a suitable fulfillment location 112 at which the user may pick up items from an order. For example, when a plurality of fulfillment locations 112 are implemented by a merchant, each fulfillment location 112 may be provided with a particular identifier to enable a particular order to be linked to the fulfillment location 112 at which the order can be picked up. Fulfillment location 112 may be determined, based on, for example, inventory, proximity to a user selected location, fulfillment location load, etc. Once a fulfillment location 112 has been determined, fulfillment location information identifying the selected fulfillment location and its geographic location may be linked to the order and sent to user system 108 by expedited pickup system 106 to facilitate pickup of items in the order by the user. In other embodiments, a user may select a fulfillment location when placing the order. In such embodiments, the order information received in operation 202 may include information indicating the selected fulfillment location for the order.

Expedited pickup system 106 may await a determination that the user is commencing travel to fulfillment location 112, e.g., via a message sent by user system 108 to expedited pickup system 106 indicating the commencement of travel (operation 204). Operation 204 may be performed in any suitable manner, for example via a response to a message sent at operation 202, e.g., from a mobile application, etc. As an example, a user may determine that an immediate trip to fulfillment location 112 would be desirable, and may therefore, immediately send a message that the user is commencing travel to fulfillment location 112 (operation 204). As another example, the user may simply begin traveling toward fulfillment center 112. Based on characteristics of this traveling (e.g., current direction, route, etc.), expedited pickup system 106 may determine that the user has commenced travel to fulfillment location 112.

Once it has been determined that the user is commencing travel to fulfillment location 112 (e.g., via a message sent by the user), user system 108 may send geographic location information (e.g., latitude and longitude coordinates) for user system 108 to expedited pickup system 106 (operation 206). As user system 108 sends such geographic information, expedited pickup system 106 may track the user's geographic position in relation to fulfillment center 112 (operation 208). Such tracking may be initiated by user system 108 pushing geographic location information or by expedited pickup system 106 requesting geographic location information from user system 108. Upon receipt of the location information, expedited pickup system 106 determines the geographic location of user system 108 to be user location 110. Tracking of a user's geographic location 110 at operation 208 may be implemented in any suitable manner.

Based on the tracked user location, expedited pickup system 106 may determine and signal an estimated time of arrival of the user at fulfillment location 112 (operation 210). Operation 210 may be performed in any suitable manner according to principles described herein. In certain examples, operations 206, 208, and 210 may be performed continually and any suitable frequency as the user travels to fulfillment location 112.

Figure 3:
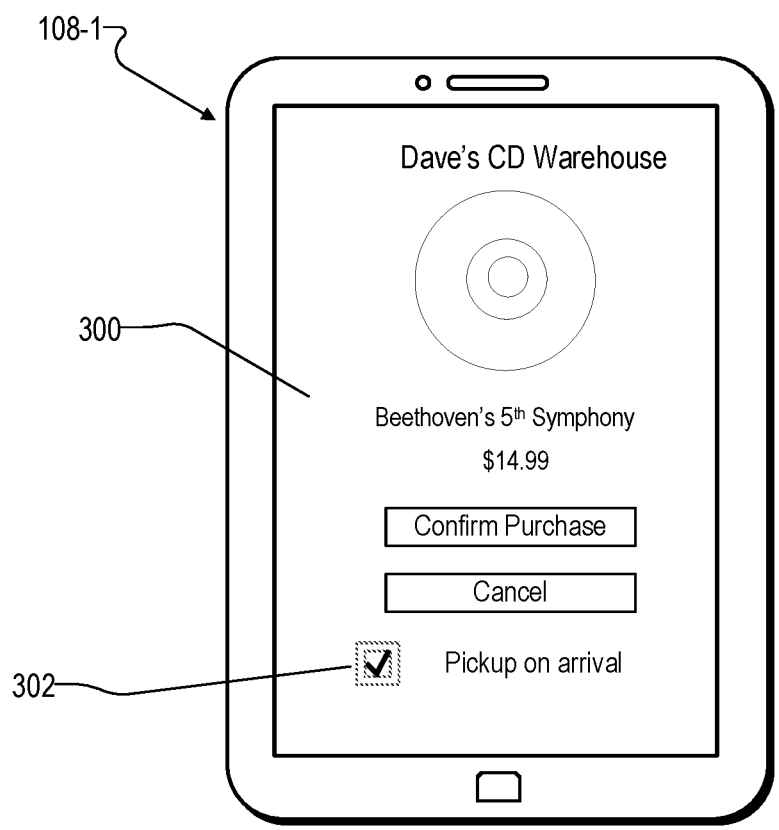
FIG. 3 illustrates an exemplary user system displaying a user interface according to embodiments of the present disclosure.

FIG. 3 illustrates an exemplary user system 108 (e.g., a tablet user device 108-1) displaying a user interface 300 according to embodiments of the present disclosure. A user may use functionality present on a user system 108 to perform one or more of the operations described herein. For example, a user may perform the steps for ordering one or more items for pickup from a merchant's web portal on user system 108 and indicate that expedited pickup is desired.

An option for a user to select expedited pickup may be provided in any suitable manner and at any suitable time on interface 300 of user system 108. For example, as shown at FIG. 3, a "check-box" type selection option 302 for expedited pickup may be provided, enabling a user to indicate the desire for expedited pickup. A user desiring to utilize an expedited pickup service may check selection option 302 and proceed with the order accordingly. According to another example, other selection-type interface elements may be provided, e.g., radio buttons, drop-down combo lists, etc., enabling the user to indicate a desire to utilize expedited pickup.

Once a user has completed an order and indicated the desire for expedited pickup of items of the order, one or more messages related to the status of the order may be provided to the user. For example, an "order available" message may be sent by any suitable method, e.g., email, SMS, chat, etc., and may include information related to a fulfillment location 112 that will fulfill the order, among others.

Figure 4:
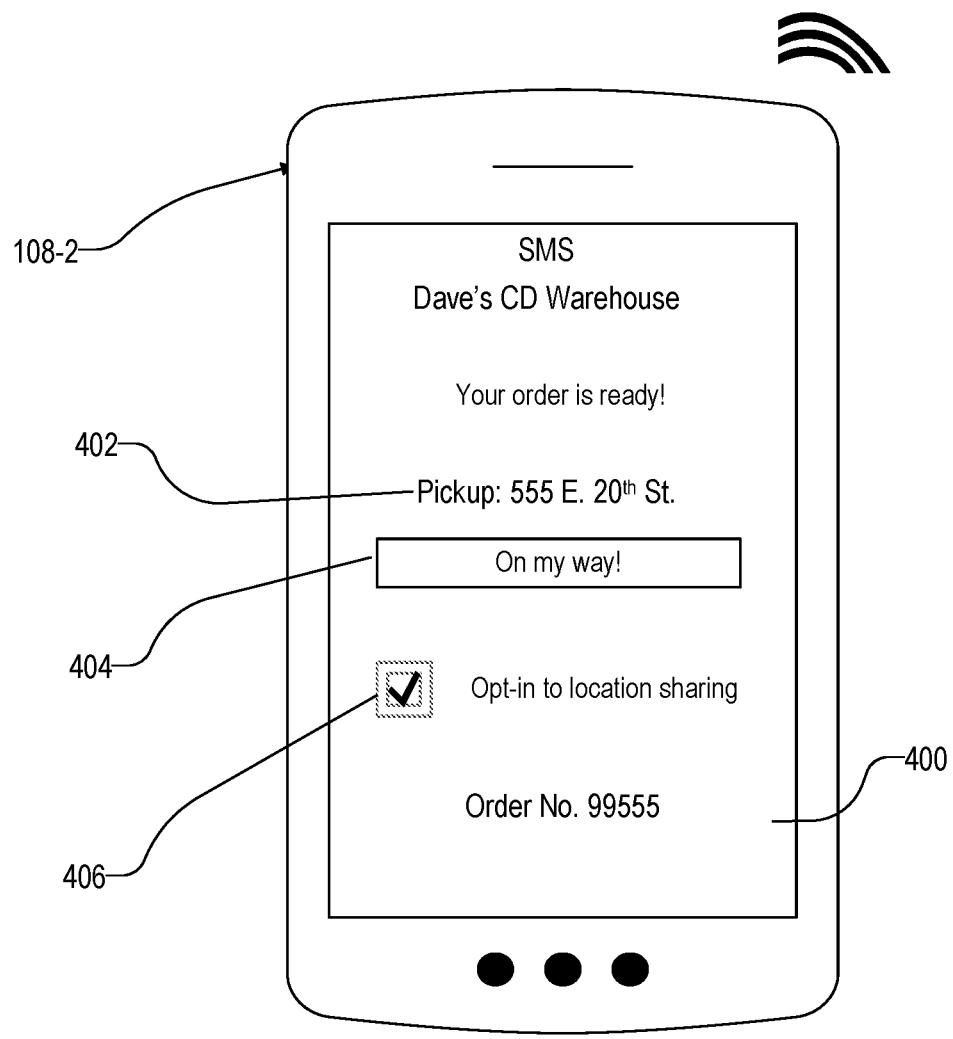
FIG. 4 illustrates another exemplary user system displaying another user interface according to embodiments of the present disclosure.

FIG. 4 illustrates an exemplary user system 108 (e.g., mobile phone user device 108-2) displaying another user interface 400 according to embodiments of the present disclosure. An "order available" message sent to user system 108 (e.g., mobile phone user device 108-2) may be displayed via a display and may include fulfillment location information 402 indicating a selected fulfillment location 112, order information, etc.

In addition, the "order available" message may include a request that a user confirm to expedited pickup system 106 or otherwise allow expedited pickup system 106 to determine when the user is commencing travel to fulfillment location 112. For example, the "order available" message may include an option 404 selectable by the user to indicate that the user is commencing travel to fulfillment location 112. Such an option may include a button configured to automatically trigger one or more operations to notify expedited pickup system 106 of the commencement of travel.

As another example, the "order available" message may enable a user to request that expedited pickup system 106 monitor user activity and/or location to automatically determine when the user commences travel to fulfillment location 112. For example, expedited pickup system 106 may implement a machine learning application configured to analyze previous user travel patterns to determine when a user has commenced travel to fulfillment location based on a present travel pattern of the user as determined from user geographic location information provided to expedited pickup system 106.

According to some embodiments, a user may be requested to opt-in to location tracking of the user for purposes of expedited pickup. For example, where a user has not already indicated a desire to opt-in for location tracking, a checkbox 406 or other suitable option may be provided at interface 400, thereby allowing the user to indicate acceptance of location tracking by expedited pickup system 106.

Once it has been determined that a user is commencing travel to fulfillment location 112, expedited pickup system 106 may either begin or continue tracking a geographic location of the user via location information provided to expedited pickup system 106 from user system 108. This may include user system 108 providing and expedited pickup system 106 receiving geographic location information descriptive of the geographic location of user system 108 and the user. User system 108 may provide geographic location information to expedited pickup system 106 in any suitable way, including via one or more messages transmitted to expedited pickup system 106 (e.g., streaming location data to expedited pickup system 106). For example, as user travels from user location 110 to fulfillment location 112, location coordinates may be transmitted to expedited pickup system 106.

A user may navigate to fulfillment location 112 in any suitable manner. For example, the user may be familiar with a route to fulfillment location 112 and may navigate unaided to fulfillment location 112. Alternatively, a navigation service provided by a navigation provider may be used to provide the user with navigation information to aid in traveling to fulfillment location 112.

Figure 5:
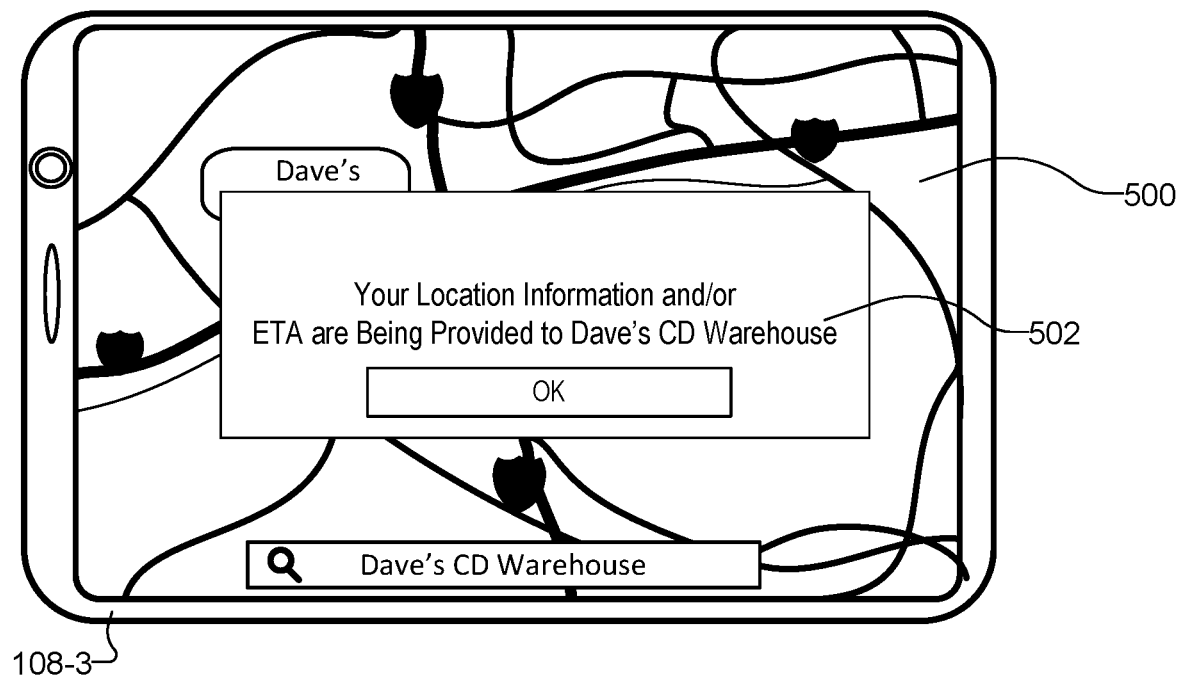
FIG. 5 illustrates an exemplary interface of a user navigation device according to embodiments of the present disclosure.

FIG. 5 illustrates an exemplary interface 500 of a user navigation device 108-3 (e.g., an in-vehicle or portable GPS device, a mobile device, etc.). User navigation device 108-3 may be configured to provide geographic location information to expedited pickup system 106 for tracking the user's location. In addition, user navigation device 108-3 may provide navigational guidance to the user, such as by providing information about the user's location, a destination, and a travel route to the destination. The information may be presented on a map user interface and/or in any other suitable way (e.g., as audio).

In addition, user navigation device 108-3 may notify a user that information is being provided by user navigation device 108-3 to expedited pickup system 106. For example, user navigation device 108-3 may display a notification message 502 indicating that location information and/or ETA information is being provided to a merchant and/or fulfillment location 112.

During user travel, as noted above, various factors may cause an ETA of the user at fulfillment location 112 to change. For example, as a user travels toward fulfillment location 112, traffic conditions may deteriorate, resulting in an ETA that is longer than originally determined. Upon determination of such a change, expedited pickup system 106 may be notified via an update message. In addition, user navigation device 108-3 may notify the user that updated information (e.g., an updated ETA) is being provided by user navigation device 108-3 to expedited pickup system 106.

Expedited pickup system 106 may include one or more devices configured to alert or otherwise indicate user and/or order information, e.g., user ETA, to an operator at fulfillment location 112. For example, one or more output devices provided at fulfillment location 112 may provide information such as the location of a user and/or an ETA of the user at fulfillment location 112.

Figure 6A:
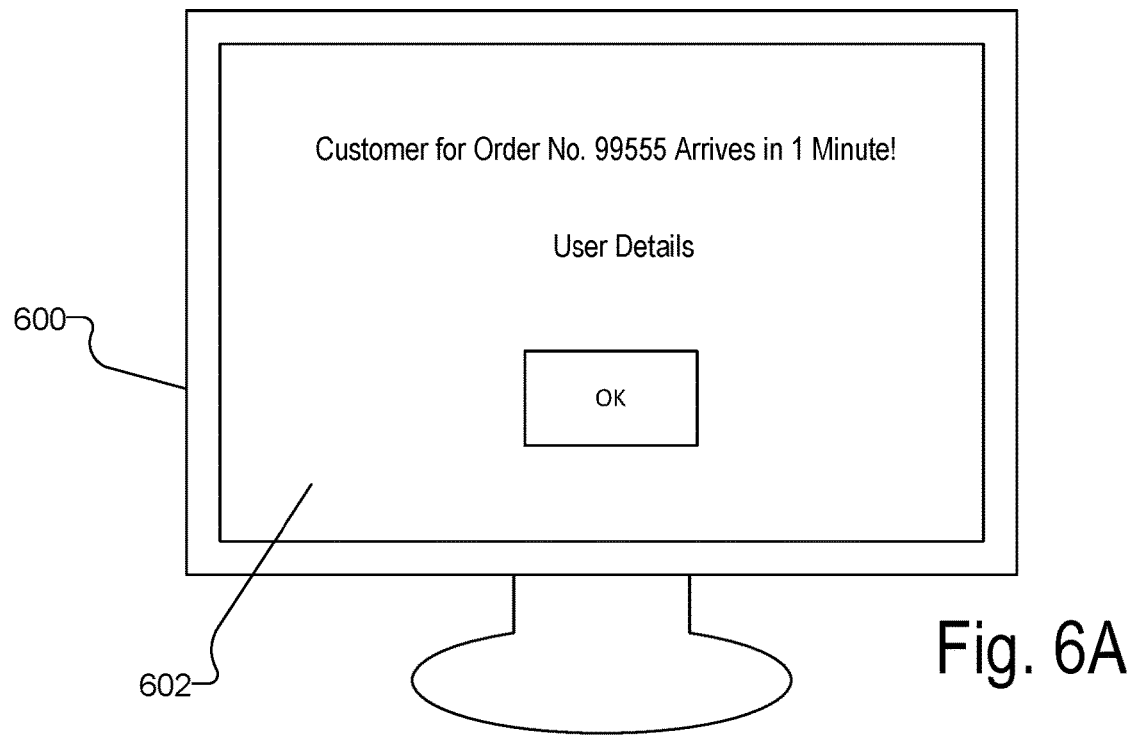
FIGS. 6A and 6B illustrate an exemplary interface at a fulfillment location according to embodiments of the present disclosure.
Figure 6B:
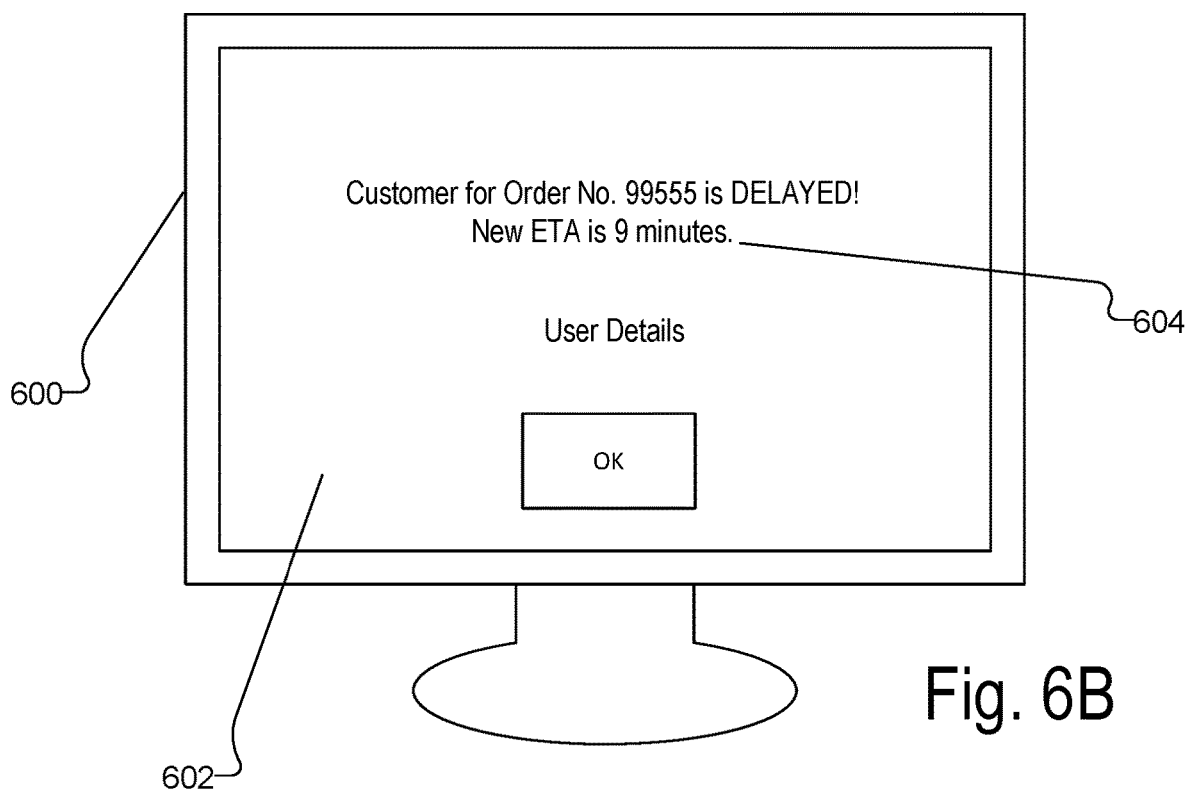

FIGS. 6A and 6B illustrate an exemplary operator interface 602 that may be presented at a fulfillment location 112. According to some embodiments, an operator may be provided with a display device 600 (e.g., mobile display, stationary display, etc.) on which interface 602 is provided to display information regarding orders along with user information. For example, expedited pickup system 106 may communicate information related to the ETA and/or user location information to the display devices for display. In certain examples, the information descriptive of the ETA and/or user location may be displayed together with additional information such as an indication as to when an order should be prepared and/or at what pickup location within fulfillment location 112 the items of the order will be picked up by the user upon arrival at fulfillment location 112.

Interface 602 may be configured to provide update information regarding the user's location, ETA, and/or order. For example, when a change in ETA has been determined by expedited pickup system 106, interface 602 may provide updated information via interface 602 such that an operator may be notified and take any suitable action. As shown at 6B, an update message 604 may be provided via interface 602 indicating a change in the ETA of a user. More or less information may be provided via interface 602 at fulfillment location 112, as desired. For example, instead of providing a user's ETA and updates thereto, interface 602 may provide only an indication that a user has entered the parking lot of fulfillment location 112. According to another example, a map display may be provided via interface 602 showing user location 110 relative to fulfillment location 112, as the user travels toward fulfillment location 112.

FIG. 7 illustrates another exemplary operation flow diagram according to some embodiments of the present disclosure. Certain operations shown in FIG. 7 may be similar to those shown in FIG. 2. A detailed description of such similar operations will, therefore, not be presented here.

As shown in FIG. 7, user system 108 (e.g., a tablet) may send order information to expedited pickup system 106 (operation 702). Expedited pickup system 106 may, in response to receipt of the order information from user system 108, send a confirmation message confirming receipt of the order to user system 108 (operation 704). For example, a confirmation message may include one or more details of the order including item(s) in the order and a fulfillment location 112 at which the order can be picked up by the user via an expedited pickup service, among other information.

Expedited pickup system 106 may determine whether a user has opted in to share suitable user information (e.g., geographic location information). If the user has not previously opted in, expedited pickup system 106 may send a request to user system 108 requesting permission to track a geographic location of the user for purposes of expedited pickup, i.e., requesting the user opt in to share suitable user information (operation 706). Alternatively, a user may have stored or otherwise granted expedited pickup system 106 a general authorization for opting in. In this case, a message may not be sent, and a user may be automatically opted in to geographic location tracking for each expedited pick up order placed.

A user may respond to the request to share personal data in any suitable manner, and a response to the request may be sent by user system 108 to expedited pickup system 106 (operation 708). For example, an SMS message may be sent by user system 108 to expedited pickup system 106 and may include a response to the request. Such a response may be positive or negative, and where negative, a user may be warned that expedited pickup will not be available, for example. According to another example, a user may respond via a web interface, resulting in one or more API calls to expedited pickup system 106 resulting in notification to expedited pickup system 106 of user's choice to share or not share data. Any other suitable methods for a user response may also be implemented.

Expedited pickup system 106 may determine a preparation state (e.g., available, incomplete, preparing, complete, ready for pickup, etc.) of an order for a user in any suitable manner. As an example, items from an order may be verified manually by an operator at fulfillment location 112 and/or automatically by a computing system at fulfillment location 112, and the operator or computing system may signal to expedited pickup system 104 that the items of the order are available for pickup. As used herein, "available for pickup" may indicate that all items are available and confirmed in inventory at fulfillment location 112.

As another example, an order state may be marked as "ready for pickup" when an operator at fulfillment location 112 has pulled items of the order from inventory. According to further examples, "ready for pickup" may be marked when the items have been assembled at fulfillment location 112 for rapid access (e.g., located curbside). Expedited pickup system 106 may be informed that the order is "ready for pickup" in any suitable manner. For example, an operator at fulfillment location 112 may update an order status via an interface, and an appropriate message sent (e.g., via an API call) to expedited pickup system 106.

Expedited pickup system 106 may notify a user of a status of the order, such as by sending a message to user system 108 informing the user of the state of the order (operation 710). Such a message may be sent by expedited pickup system 106 in response to the order state being updated at fulfillment location 112, such as when the order state has been updated to "available for pickup" or "ready for pickup," for example.

Expedited pickup system 106 may determine when a user is commencing travel to fulfillment location 112 (operation 712) in any suitable way, including in any of the ways described herein. For example, user system 108 may send a message to expedited pickup system 106 to indicate that the user is commencing travel to fulfillment location 112. According to certain embodiments, user system 108 may send such message in response to user input received at user system 108 that indicated that the user is commencing travel. The user may provide such input to user system 108 in response to a request included in an order status message sent to user system 108 in operation 710 (which response may indicate a user selection of a link included in the order status message to enable tracking in certain examples).

Once expedited pickup system 106 has determined that a user has commenced travel to fulfillment location 112, user system 108 may begin sending geographic location information (e.g., latitude and longitude coordinates) to expedited pickup system 106 (operation 714). Geographic location information may be provided in any suitable manner. Expedited pickup system 106 may track the user's geographic location in relation to fulfillment center 112 (operation 716).

As the user travels from user location 110 to fulfillment location 112, expedited pickup system 106 may continue to determine and signal an ETA of the user at fulfillment location 112 (operation 718). Operation 718 may be implemented in any suitable manner according to principles described herein. For example, expedited pickup system 106 may determine an ETA based on user location information and signal the ETA to fulfillment location 112 (e.g., an operator or computing system at fulfillment location) and/or to user system 108.

Expedited pickup system 106 may be configured to provide one or more notifications to an operator of fulfillment location 112 (e.g., a merchant) to assist the operator in timely preparation of order items for pickup. Such notifications may be provided by expedited pickup system 106 based on tracked user location during travel of the user to fulfillment location 112 and may provide any useful information to the operator of fulfillment location 112. For example, expedited pickup system 106 may provide a notification that indicates the estimated ETA of the user at fulfillment location 112, a notification that indicates an updated ETA of the user at fulfillment location 112, a notification that indicates that the user is within a specific ETA threshold or distance threshold of fulfillment location 112, a notification that indicates that the user is at a particular geographic location relative to fulfillment location 112, a notification that indicates arrival of the user at fulfillment location 112, etc. A notification that indicates arrival of the user at fulfillment location 112 may indicate arrival of the user on the premises of fulfillment location 112 or arrival of the user at a specific pickup location at fulfillment location 112 (e.g., at a curbside pickup location, at a pickup kiosk, etc.). Such notifications may be useful to the operator of fulfillment location 112 in providing timely preparation of order items for pickup by the user.

Expedited pickup system 106 may be configured to provide one or more notifications to a user of user system 108 to inform and/or assist the user in timely, efficient, and/or convenient pickup of order items at fulfillment location 112. For example, expedited pickup system 106 may provide a notification that indicates a specific pickup location at fulfillment location 112 at which the order items will be made available for pickup. The specific location may be a specific vehicle parking spot, drive-thru window, kiosk, etc.

In certain examples, expedited pickup system 106 may be configured to provide a notification to the user of user system 108 in response to detecting an occurrence of a predefined event. For instance, expedited pickup system 106 may provide a notification based on the user being detected to be within a certain ETA or distance of fulfillment location 112 or the user being detected to have arrived at fulfillment location 112.

In certain examples, expedited pickup system 106 may be configured to provide, to user system 108, micro-navigation guidance to a specific pickup location at fulfillment location 112. For example, expedited pickup system 106 may push one or more notification messages and/or micro-navigation guidance information to user system 108 to assist the user in navigating to the specific pickup location (e.g., a specific vehicle parking spot, drive-thru window, kiosk, etc.). In certain examples, expedited pickup system 106 may provide micro-navigation guidance to a specific pickup location at fulfillment location 112 in response to detecting an occurrence of a predefined event such as the user being detected to be within a certain ETA or distance of fulfillment location 112 (e.g., an ETA or distance indicating the user is close to arrival), the user being detected to have arrived at fulfillment location 112, and/or an assignment by the operator of fulfillment location 112 of a specific pickup location at fulfillment location 112.

In certain examples, expedited pickup system 106 may be configured to perform one or more operations to facilitate third-party pickup of order items. For example, a user who has placed an order and selected an expedited pickup option for the order may arrange for a third party (e.g., a delivery service) to pick up ordered items. Expedited pickup system 106 may perform any suitable operations to facilitate expedited pickup of the order items by the third party and/or to inform the user of progress by the third party in picking up the order items.

To illustrate an example, the user who placed the order may use user system 108 to indicate to expedited pickup system 106 that the user wants a third party to pick up order items at fulfillment location 112. This indication may be provided to by user system 108 to expedited pickup system 106 in any suitable way. For example, a message sent by expedited pickup system 106 to user system 108 and/or a user interface provided by user system 108 may include a third-party pickup option that is selected by the user of user system 108 to indicate that a third party will pick up the order items. User system 108 may detect a selection of the option and send a message to expedited pickup system 106 that is descriptive of the selection.

In response to receiving the message, expedited pickup system 106 may send a third-party pickup message to user system 108 that includes content (e.g., information such as an order identifier and a fulfillment location identifier, a link, etc.) configured to be used by a third party to pick up the order items on behalf of the user. The user may send the third-party pickup message to a third party, and the third party may use the message to begin interacting with expedited pickup system 106 to facilitate third-party pickup of the order items. For example, the third party may select a link included in the third-party pickup message to initiate communication of a third-party computing device (e.g., a mobile device of an agent of the delivery service) with expedited pickup system 106 and to provide information about the third party (e.g., a third-party name, third-party computing device identifier, third-party vehicle, a third-party vehicle license plate, etc.) to expedited pickup system 106.

Expedited pickup system 106 may then interact with the third-party computing device in any of the ways described herein to facilitate expedited pickup of the order items by an operator of the third-party computing device on behalf of the user. For example, expedited pickup system 106 may determine that the third-party computing device has commenced travel to fulfillment location 112 in any of the ways described herein and may request and receive location tracking opt-in from the operator of the third-party computing device. Once travel to fulfillment location 112 is determined to have commenced and the third party has opted in to location tracking for expedited pickup of the order items, expedited pickup system 106 may perform further operations described herein to facilitate pickup of the order items by the third party, including by tracking the location of the third-party during travel to fulfillment location 112 and determining and signaling an ETA of the third party at fulfillment location 112. In such a situation, the third party and third-party computing device may be considered a user and a user system 108, respectfully, such that expedited pickup system 106 may interact with user system 108 associated with a third-party user to facilitate expedited pickup of order items by the third-party user in any of the ways described herein.

In addition, expedited pickup system 106 may perform one or more additional operations to facilitate expedited pickup by a third party. For example, expedited pickup system 106 may perform one or more verification operations to verify that a requested third-party expedited pickup is legitimate and actually requested by the user who placed the order. For instance, after expedited pickup system 106 has received a message from a third-party computing device requesting third-party pickup of order items for an order, expedited pickup system 106 may verify that information received from the third-party computing device matches data maintained by expedited pickup system 106 for the order. In addition, expedited pickup system 106 may send a message to user system 108 requesting that the user of user system 108 verify the third-party pickup. The message may include information about the third party (e.g., an identifier such as a name, a vehicle, and/or a vehicle license plate for the third party) that the user may compare to information that the user received from the delivery service and notify expedited pickup system 106 that the information matches or not. If the user confirms that the information matches, expedited pickup system 106 may treat the third-party pickup request as legitimate and proceed to interact with the third-party computing device to facilitate expedited pickup, including by tracking the location of the third-party computing de and providing fulfillment location information, navigation guidance, notifications, etc. to the third-party computing device.

Expedited pickup system 106 may also provide information to the user who placed the order to allow the user to track the progress of the third party in picking up the order items. For example, expedited pickup system 106 may provide estimated ETA information for the third party to the user, may notify the user when the third party arrives at fulfilment location 112, and/or may notify the user when the third party successfully picks up the order items at fulfillment location 112.

Figure 8:
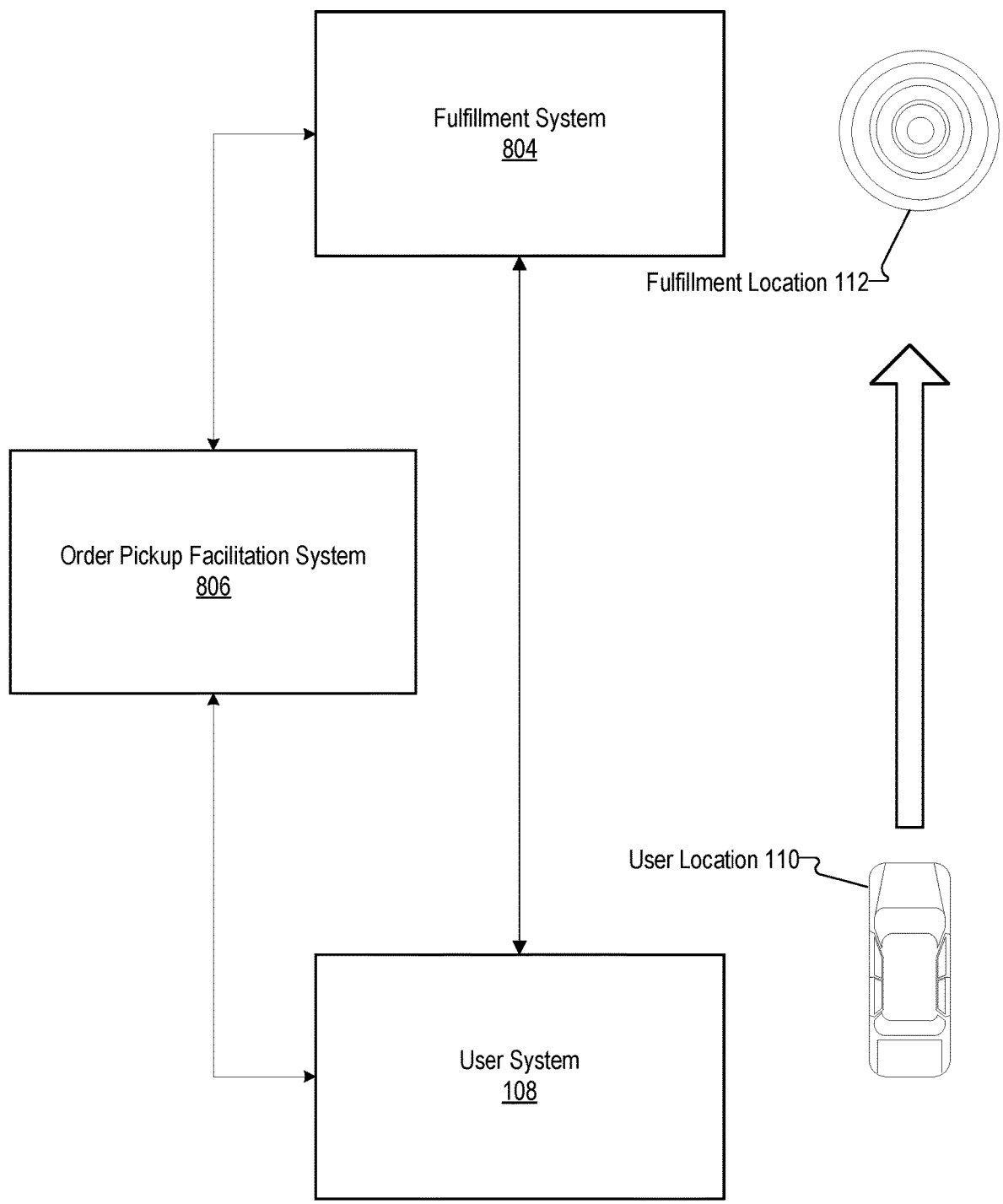
FIG. 8 illustrates an exemplary configuration in which an expedited order pickup system is employed as a fulfillment system and an order pickup facilitation system, according to principles described herein.

The functionality associated with expedited pickup system 106 described herein may be distributed across multiple devices in any suitable manner. For example, according to certain embodiments, a merchant may operate an order handling portion of expedited pickup system 106, hereinafter referred to as a "fulfillment system," and another party may operate other portions of expedited pickup system 106. FIG. 8 illustrates an exemplary configuration in which an expedited pickup system is implemented as a fulfillment system 804 (e.g., a merchant-operated fulfillment system) and an order pickup facilitation system 806, according to principles described herein.

Fulfillment system 804 may include one or more computer systems configured to perform handling operations, such as exemplary order handling operations described above in reference to expedited pickup system 106. For example, fulfillment system 804 may send and receive messages and/or information related to an order and a user associated with the order, over one or more networks, to/from user system 108, fulfillment location 112, and/or order pickup facilitation system 806. Messages that may be sent and/or received by fulfillment system 804 may include, for example, an order message, an order receipt confirmation, an order status message (e.g., a message indicating that an order is ready for pickup), an order canceled message, a user location information message, and an ETA information message, among others.

In addition, fulfillment system 804 may include one or more applications configured to provide an application programming interface (i.e., API) via which another application, either remotely located or co-located with the fulfillment system 804, may execute functionality associated with fulfillment system 804. The APIs may be implemented in any suitable application and may be exposed via any suitable access protocol, for example, REST, SOAP, etc. For example, an order placed by a customer via an e-commerce web site may cause one or more applications running on a web server to call certain functions of the API in order to create the order, store the order, and link the order to the user. According to another example, as will be discussed in greater detail below, an API present on fulfillment system 804 may be configured to receive an ETA of a user at fulfillment location 112 and/or user location information from order pickup facilitation system 806.

Fulfillment system 804 may be implemented in any suitable manner. As an example, fulfillment system 804 may be integrated with a merchant system (e.g., a merchant's e-commerce portal) such that an order placed with the merchant via the portal may be accessible by fulfillment system 804.

As another example, fulfillment system 804 may be operated and maintained by the merchant separately from the merchant's e-commerce portal and/or other merchant systems, or a merchant may contract or otherwise obtain services from a third-party fulfillment provider to operate and maintain fulfillment system 804.

Fulfillment system 804 may be configured to determine a fulfillment location 112 at which a user is to pick up items of an order. Therefore, fulfillment system 804 may be communicatively linked with one or more inventory systems for a merchant, enabling a determination to be made by fulfillment system 804 as to whether one or more items of an order are available at one or more fulfilment locations 112. According to some embodiments, upon receipt of order information from user system 108, fulfillment system 804 may check inventory at one or more fulfillment locations, which may include fulfillment location 112, for items included in the order and select a particular fulfillment location with the items in stock and most closely matching user preferences to function as the fulfillment location at which the order, or at least part of the order, is to be fulfilled.

Order pickup facilitation system 806 may include one or more computer systems configured to communicate with fulfillment system 804 and user system 108 to perform operations to facilitate expedited order pickup as described herein. Order pickup facilitation system 806 may be configured to act as an intermediary between fulfillment system 804 and user system 108, and may perform certain functionality previously described as associated with expedited pickup system 106. For example, order pickup facilitation system 806 may perform geographic location tracking and/or ETA estimation and signaling functions associated with expedited pickup system 106, among others.

Figure 9:
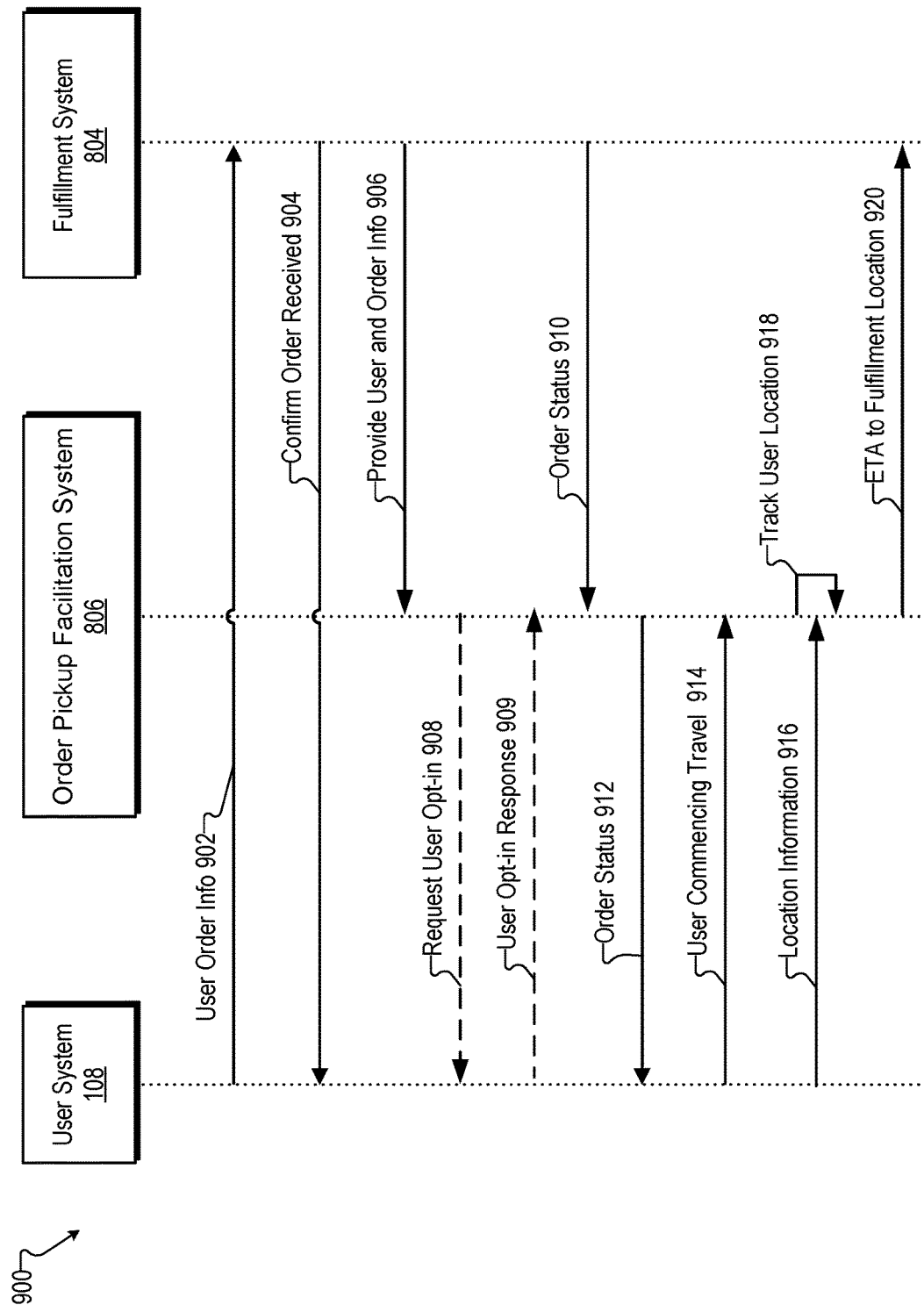
FIG. 9 illustrates another exemplary operation flow diagram according to embodiments of the present disclosure.

FIG. 9 illustrates another exemplary operation flow diagram according to embodiments of the present disclosure. Some operations shown at FIG. 9 may be similar to those shown at FIGS. 2 and 7. Therefore, only differences in the performance of the similar operations will be described.

As shown at FIG. 9, user system 108 may send order information to fulfillment system 804 (operation 902). Fulfillment system 804 may, in response to receipt of the order information from user system 108, send a confirmation message confirming receipt of the order to the user (operation 904).

User order information received by fulfillment system 804 may indicate that a user has requested expedited pickup for the order. Based on this indication, fulfillment system 804 may provide user and order information to order pickup facilitation system 806 (operation 906). For example, fulfillment system 804 may message order pickup facilitation system 806 with user identifying information and a fulfillment location identifier, such that order pickup facilitation system 806 may identify user system 108 associated with the user and a fulfillment location to which it is anticipated that the user will travel to pick up an order item.

Order pickup facilitation system 806 may optionally determine whether a user has opted in to share suitable user information (e.g., geographic location tracking), which may include order pickup facilitation system 806 sending a request for opt-in to user system 108 (operation 908). A user may respond to the request to share user information, and user system 108 may send a message indicating the response to order pickup facilitation system 806 in any suitable manner (operation 909).

Fulfillment system 804 may determine a preparation state (e.g., available, incomplete, preparing, complete, ready for pickup, etc.) of an order for a user in any suitable manner. Fulfillment system 804 may notify order pickup facilitation system 806 of the determined preparation state (i.e., order status) of the order, such as by sending an order status message to order pickup facilitation system 806 (operation 910). For example, an operator at fulfillment location 112 may update an order status via an interface, and an appropriate message may be sent by fulfillment system 804 (e.g., via an API call) to order pickup facilitation system 806.

Order pickup facilitation system 806 may notify a user of the status of the order, such as by sending an order status message to user system 108 (operation 912). Additionally or alternatively, fulfillment system 804 may send an order status message to user system 108. In certain examples, the order status message may be configured to notify the user that the order is available or ready for pickup at fulfillment location 112 and to request that the user indicate when the user commences or will commence travel to fulfillment location 112 to pick up an order item.

Order pickup facilitation system 106 may then determine when a user is commencing travel to fulfillment location 112 in any suitable manner, including in any of the ways described herein. For example, order pickup facilitation system 806 may receive a message from user system 108 indicating that the user is commencing travel to fulfillment location 112 (operation 914). Based on the determination that the user is commencing travel to fulfillment location 112, user system 108 may begin sending geographic location information (e.g., latitude and longitude coordinates) to order pickup facilitation system 806 (operation 916). Geographic location information may be provided in any suitable manner according to principles disclosed herein.

Order pickup facilitation system 806 may track the user's geographic location in relation to fulfillment center 112 based on location information received from user system 108 (operation 918). As the user travels from user location 110 to fulfillment location 112, order pickup facilitation system 806 may continue to determine and update an ETA of the user at fulfillment location 112 and signal the ETA to fulfillment location 112 (operation 920).

Figure 10:
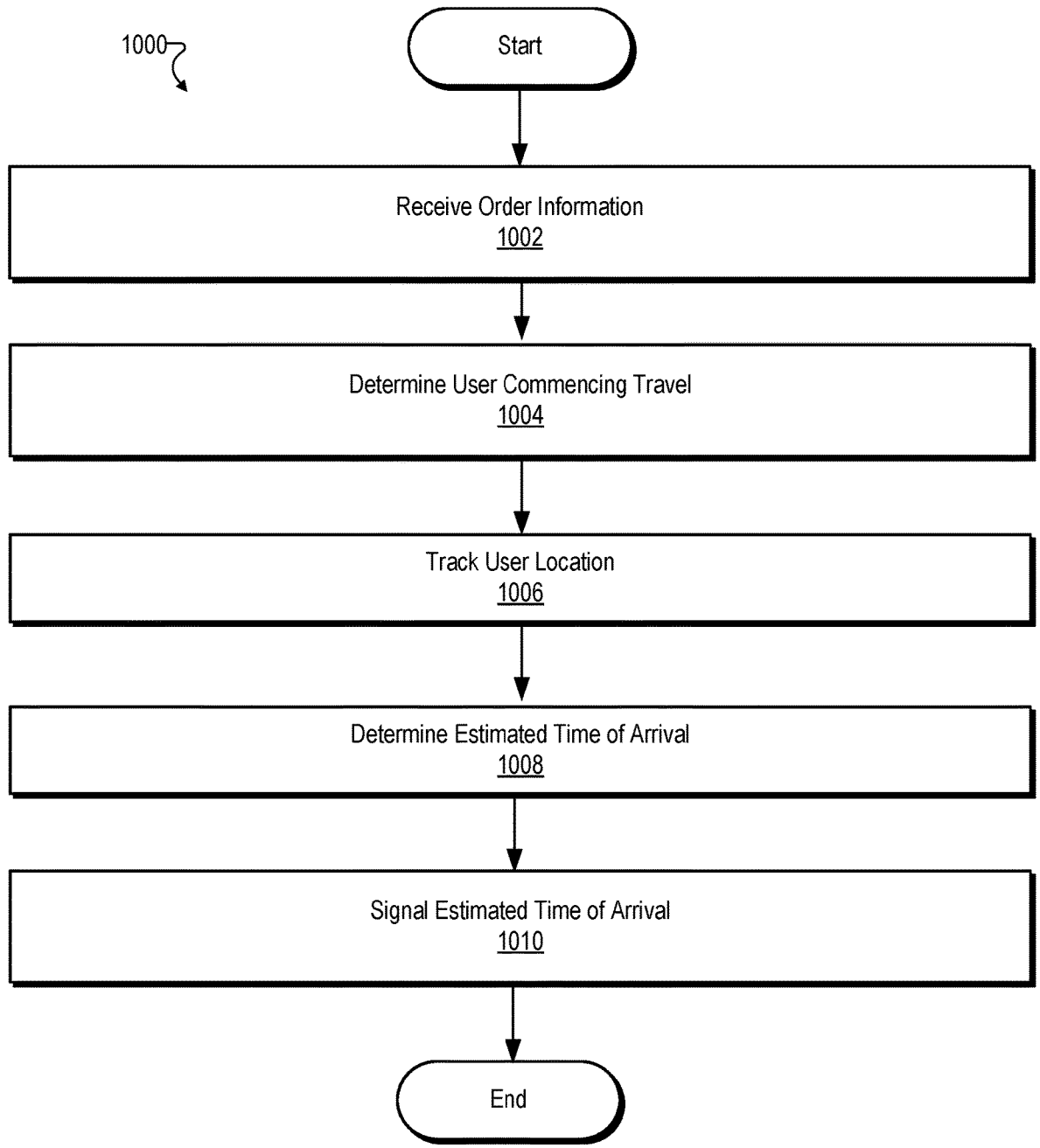
FIG. 10 illustrates an exemplary method according to embodiments of the present disclosure.

FIG. 10 illustrates an exemplary method according embodiments of the present disclosure. While FIG. 10 illustrates exemplary operations according to certain embodiments, other embodiments may omit, add to, reorder, and/or modify any of the operations shown in FIG. 10. One or more of the operations shown in FIG. 10 may be performed by expedited pickup system 106, fulfillment system 904, order pickup facilitation system 906, or any implementation thereof.

In operation 1002, a system receives order information. Operation 1002 may be performed in any of the ways described herein.

In operation 1004, the system determines that a user is commencing travel to a fulfillment location to pick up an item in the order. Operation 1004 may be performed in any of the ways described herein.

In operation 1006, the system tracks a geographic location of the user. Operation 1006 may be performed in any of the ways described herein.

In operation 1008, the system determines an estimated time of arrival of the user at a fulfillment location. Operation 1008 may be performed in any of the ways described herein.

In operation 1010, the system signals the estimated time of arrival to the fulfillment location to which the user is traveling. Operation 1010 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. System components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 11:
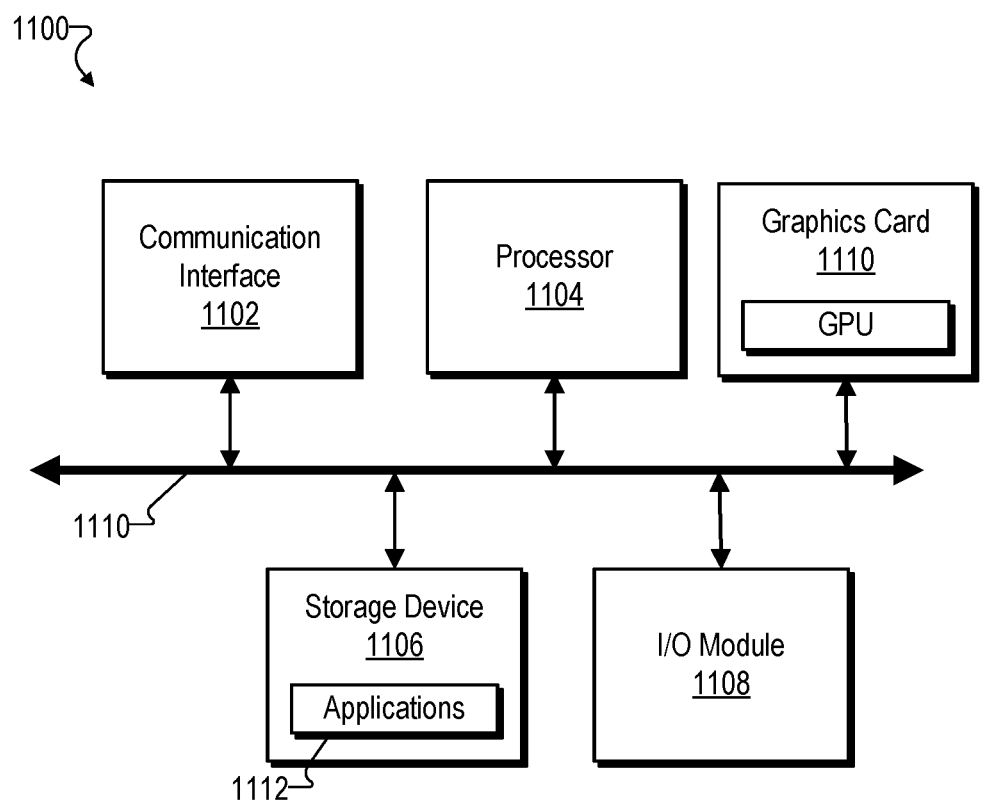
FIG. 11 illustrates an exemplary computing device that may be specifically configured to perform one or more of the processes described herein.

FIG. 11 illustrates an exemplary computing device 1100 that may be specifically configured to perform one or more of the processes described herein. As shown in FIG. 11, computing device 1100 may include a communication interface 1102, a processor 1104, a storage device 1106, and an input/output ("I/O") module 1108 communicatively connected via a communication infrastructure 1110. While an exemplary computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, an audio/video connection, and any other suitable interface.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1106. For example, data representative of one or more executable applications 1112 configured to direct processor 1104 to perform any of the operations described herein may be stored within storage device 1106. In some examples, data may be arranged in one or more databases residing within storage device 1106.

I/O module 1108 may include one or more I/O modules configured to receive user input and provide user output. One or more I/O modules may be used to receive input. I/O module 1108 may include any hardware, firmware, software, or combination thereof supportive of input and output capabilities. For example, I/O module 1108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the systems and/or system components described herein may be implemented by or within one or more components of computing device 1100. For example, one or more applications 1112 residing within storage device 1106 may be configured to direct processor 1104 to perform one or more processes or functions associated with expedited pickup system 106, user system 108, fulfillment system 804, and order pickup facilitation system 806.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A system comprising:
   a processor; and
   a non-transitory computer-readable medium communicatively coupled to the processor and storing instructions executable by the processor to:
   receive order information comprising an order identifier identifying an order and a user identifier identifying a user associated with the order;
   receive a notification that the user has indicated that a third party will pick up an item associated with the order;
   send a message to a first user device that is associated with the user, the message configured to be used by the third party to interact with a pickup system to facilitate a pickup of the item by the third party on behalf of the user;
   receive a communication from a second user device that is associated with the third party, the communication including information about the order and information about the third party;
   send, after receiving the communication from the second user device that is associated with the third party, a message to the first user device requesting that the user verify the pickup of the item by the third party on behalf of the user;
   receive a confirmation from the first user device verifying the pickup of the item by the third party on behalf of the user;
   determine, after receiving the confirmation, that the third party is commencing travel to a fulfillment location to pick up the item;
   automatically track, in response to the determination, a geographic location of the third party based on at least one of a Global Positioning System (GPS) signal or cellular triangulation;
   determine, based on the geographic location, an estimated time of arrival of the third party at the fulfillment location; and
   signal the estimated time of arrival of the third party at the fulfillment location to facilitate timely preparation of the item for pickup by the third party at the fulfillment location.

2. The system of claim 1, wherein the processor is configured to:
   receive traffic information indicative of a traffic condition; and
   determine the estimated time of arrival based on the geographic location and the traffic condition.

3. The system of claim 1, wherein the processor is configured to send, to the third party prior to determining that the third party is commencing travel to the fulfillment location, a message indicating the fulfillment location at which the item is to be picked up.

4. The system of claim 1, wherein the processor is configured to:
   determine, based on the geographic location, if the third party has deviated from a path to the fulfillment location;
   adjust the estimated time of arrival based on the determined deviation; and
   signal the adjusted estimated time of arrival at the fulfillment location.

5. The system of claim 4, wherein, when a number of determined deviations exceeds a predetermined threshold, the processor is configured to send, to the third party, a message requesting confirmation that the third party is traveling to the fulfillment location.

6. The system of claim 1, wherein the tracking of the geographic location of the third party comprises receiving a latitude coordinate and a longitude coordinate of the third party from a user system, wherein the user system is a smartphone, a vehicle installed system, or a portable navigation system.

7. The system of claim 1, wherein the tracking is performed at a predetermined frequency.

8. The system of claim 1, wherein the processor is configured to:
   provide an order confirmation message to the third party to confirm the order;
   receive fulfillment information indicating the fulfillment location at which the item is to be picked up;
   send, to the third party prior to determining that the third party is commencing travel to the fulfillment location, a message indicating the fulfillment location at which the item is to be picked up.

9. The system of claim 1, wherein:
   the order information is received from a fulfillment system associated with a merchant; and
   the signaling of the estimated time of arrival comprises transmitting data representative of the estimated time of arrival to the fulfillment system associated with the merchant.

10. The system of claim 1, wherein the processor is configured to:
send a message to the first user device notifying the user of progress of the third party in picking up the item, the message including an estimated time of arrival of the third party at the fulfillment location.

11. The system of claim 1, wherein the processor is configured to:
provide micro-navigation guidance information to the second user device, the micro-navigation guidance information indicating a specific vehicle parking spot at which to pick up the item.

12. A method comprising:
receiving, by an expedited pickup system, order information comprising an order identifier identifying an order and a user identifier identifying a user associated with the order;
receiving, by the expedited pickup system and from a first user device that is associated with the user, a notification that a third party will pick up an item associated with the order;
transmitting, by the expedited pickup system and to the first user device, a message configured to be used by the third party to interact with the expedited pickup system to facilitate a pickup of the item by the third party on behalf of the user;
receiving, by the expedited pickup system and from a second user device that is associated with the third party, a communication including information about the order and information about the third party;
sending, by the expedited pickup system and after receiving the communication from the second user device that is associated with the third party, a message to the first user device requesting that the user verify the pickup of the item by the third party on behalf of the user;
receiving, by the expedited pickup system, a confirmation from the first user device verifying the pickup of the item by the third party on behalf of the user;
determining, by the expedited pickup system and after receiving the confirmation, that the third party is commencing travel to a fulfillment location to pick up the item;
automatically tracking, by the expedited pickup system and in response to the determination, a geographic location of the third party based on at least one of a Global Positioning System (GPS) signal or cellular triangulation;
determining, by the expedited pickup system and based on the geographic location, an estimated time of arrival of the third party at the fulfillment location; and
signaling, by the expedited pickup system, the estimated time of arrival of the third party at the fulfillment location to facilitate timely preparation of the item for pickup by the third party at the fulfillment location.

13. The method of claim 12, further comprising:
receiving, by the expedited pickup system, traffic information indicative of a traffic condition; and
determining, by the expedited pickup system, the estimated time of arrival based on the geographic location and the traffic condition.

14. The method of claim 12, further comprising:
determining, by the expedited pickup system and based on the geographic location, if the third party has deviated from a path to the fulfillment location;
adjusting, by the expedited pickup system, the estimated time of arrival based on the determined deviation; and
signaling, by the expedited pickup system, the adjusted estimated time of arrival at the fulfillment location.

15. The method of claim 14, further comprising:
determining, by the expedited pickup system, that a number of determined deviations exceeds a predetermined threshold; and
sending, by the expedited pickup system and in response to the determining that the number of determined deviations exceeds the predetermined threshold, a message to the third party requesting confirmation that the third party is traveling to the fulfillment location.

16. The method of claim 12, wherein the tracking of the geographic location of the third party comprises receiving a latitude coordinate and a longitude coordinate of the third party from the second user device, wherein the second user device is a smartphone, a vehicle installed system, or a portable navigation system.

17. The method of claim 12, further comprising:
receiving, by the expedited pickup system, fulfillment information indicating the fulfillment location at which the item is to be picked up; and
sending, by the expedited pickup system and to the second user device prior to determining that the third party is commencing travel to the fulfillment location, a message indicating the fulfillment location at which the item is to be picked up.

18. A method comprising:
receiving, by an order pickup facilitation system, order information comprising an order identifier identifying an order and a user identifier identifying a user associated with the order;
receiving, by the order pickup facilitation system and from a merchant system, a message indicating order fulfillment location information;
transmitting, by the order pickup facilitation system and to a user system, a message indicating the order fulfillment location information;
receiving, by the order pickup facilitation system and from the user system, a notification that a third party will pick up an item associated with the order;
transmitting, by the order pickup facilitation system and to the user system, a message configured to be used by the third party to interact with the order pickup facilitation system to facilitate a pickup of the item by the third party on behalf of the user;
receiving, by the order pickup facilitation system and from a third-party system, a communication including information about the order and information about the third party;
sending, by the order pickup facilitation system and after receiving the communication from the third party system, a message to the user system requesting that the user verify the pickup of the item by the third party on behalf of the user;
receiving, by the order pickup facilitation system, a confirmation from the user system verifying the pickup of the item by the third party on behalf of the user;
receiving, by the order pickup facilitation system and from the third-party system after receiving the confirmation, an additional confirmation indicating that the third party is commencing travel to a fulfillment location indicated by the fulfillment location information to pick up the item;
automatically tracking, by the order pickup facilitation system and in response to the additional confirmation, a geographic location of the third party based on at least one of a Global Positioning System (GPS) signal or cellular triangulation;
determining, by the order pickup facilitation system and based on the geographic location, an estimated time of arrival of the third party at the fulfillment location; and
signaling, by the order pickup facilitation system and to the merchant system, the estimated time of arrival of the third party at the fulfillment location to facilitate timely preparation of the item for pickup by the third party at the fulfillment location.

* * * * *